United States Patent [19]
Farrah

[11] Patent Number: 5,432,077
[45] Date of Patent: Jul. 11, 1995

[54] ENHANCED ADSORBENT MATERIALS AND METHOD OF MANUFACTURE AND USE THEREOF

[75] Inventor: Samuel R. Farrah, Gainesville, Fla.

[73] Assignee: University of Florida, Gainesville, Fla.

[21] Appl. No.: 763,528

[22] Filed: Sep. 23, 1991

Related U.S. Application Data

[60] Division of Ser. No. 441,518, Nov. 27, 1989, Pat. No. 5,051,189, which is a continuation-in-part of Ser. No. 304,130, Jan. 31, 1989, abandoned, which is a continuation-in-part of Ser. No. 166,365, Mar. 10, 1988, abandoned, which is a continuation of Ser. No. 868,553, May 30, 1986, abandoned.

[51] Int. Cl.$^6$ .................. C12N 1/38; B01D 15/00; C02F 1/42
[52] U.S. Cl. .................. 435/244; 436/178; 536/56; 536/121; 210/679; 210/681; 427/343; 502/404
[58] Field of Search .......... 502/404; 427/343; 210/679, 681; 422/7; 436/177, 178, 824; 435/244, 29; 536/56, 121

[56] References Cited

U.S. PATENT DOCUMENTS

| | | | |
|---|---|---|---|
| 3,192,156 | 6/1965 | Joyce | 210/63 |
| 3,222,277 | 12/1965 | Joyce | 210/63 |
| 3,499,837 | 3/1970 | Jaunarajs | 210/59 |
| 3,883,438 | 5/1975 | Remer | 252/1 |
| 3,900,422 | 8/1975 | Terajima et al. | 252/426 |
| 4,280,925 | 7/1981 | Kiefer | 252/428 |
| 4,361,486 | 11/1982 | Hou et al. | 210/722 |
| 5,051,189 | 9/1991 | Farrah | 210/679 |
| 5,114,894 | 5/1992 | Witt | 502/62 |

OTHER PUBLICATIONS

"Virus Adsorption to Microporous Filters Modified by In Situ Precipitation of Metallic Salts", Toranzos, Erdos, Farrah.
"Adsorption of Viruses to Diatomaceous Earth Modified by in situ Precipitation of Metallic Salts", Farrah, Girard, Toranzos, Preston.
"Concentration of Viruses from Water by Using Cellulose Filters Modified by in situ Precipitation of Ferric and Aluminum Hydroxides", Farrah and Preston.

*Primary Examiner*—Nina Bhat
*Attorney, Agent, or Firm*—Kerkam, Stowell, Kondracki & Clarke

[57] ABSTRACT

A method of modifying the adsorptive characteristics of an adsorptive surface comprising the in situ precipitation of a polyvalent metal salt from a solution in contact with the adsorptive surface; the adsorptive product produced thereby and methods for the removal of impurities from aqueous materials by contact with the adsorptive product.

31 Claims, 1 Drawing Sheet

ENHANCED ADSORBENT MATERIALS AND METHOD OF MANUFACTURE AND USE THEREOF

Research leading to the completion and reduction to practice of the invention was supported, in part, by the United States Environmental Protection Agency via Grant No. R810126-01-1. The United States Government has certain rights in and to the claimed invention.

This is a division of application Ser. No. 07/441,518, filed Nov. 27, 1989, now U.S. Pat. No. 5,051,189, which is a continuation-in-part of application Ser. No. 07/304,130, filed Jan. 31, 1989, now abandoned, which is a continuation-in-part of application Ser. No. 07/166,365, filed Mar. 10, 1988, now abandoned, which is a continuation of application Ser. No. 06/868,553, filed May 30, 1986, now abandoned.

BACKGROUND OF INVENTION

1. Field of Invention

The present invention relates to adsorbent materials having enhanced adsorptive properties and a method for their manufacture.

2. Prior Art

Unwanted impurities such as viruses, bacteria, proteins and metals have been recovered from water using different types of filters and adsorption-elution procedures [Gerba, Advances in Applied Microbiology 30:133-158 (1984); Farrah et al, In: C. P. Gerba and S. M. Goyal (ed.), Methods in Environmental Virology, Marcel Dekker, New York (1982); Farrah et al, Appl. Environ. Microbiol. 31:221-226 (1976); Goyal et al, In: B. J. Dutka (ed.) Membrane Filtration, Marcel Dekker, New York (1981); Hill et al, Water Res. 967-995 (1971); Payment et al, Appl. Environ. Microbiol. 47:591-592 (1984); Singh et al, Appl. Environ. Microbiol. 45:232-237 (1983); Sobsey et al, Can. J. Microbiol. 23:770-778 (1977); Vilagines et al, Can. J. Microbiol. 28:783-787 (1982); Wallis et al, J. Am. Water Wrks. Assoc. 64:189-196 (1972); Wallis et al, J. Am. J. Epidemiology 85:459-468 (1967); Wallis et al, Annu. Rev. Microbiol. 33:413-437 (1979); Liu et al, Appl. Microbiol. 21:405-410 (1971) and Melnick et al, Am. J. Hyg., 59:185-195 (1954)]. The use of filters has permitted recovery of small amounts of impurities from relatively large volumes of water. Impurities can also be recovered from solutions by adsorption to insoluble precipitates of metallic ions. In particular, insoluble salts of aluminum, calcium, and magnesium have been found to efficiently adsorb a variety of contaminants.

Ferric chloride has been used to enhance the formation of virus-adsorbing flocs in solutions that have been used to elute viruses adsorbed in membrane filters. These flocs and precipitates have been formed in relatively small volumes of water or other liquid and collected by centrifugation or filtration. The need to use centrifugation and the limited capacity of filters to collect flocs before clogging has limited the volume of water that can be easily sampled using these flocs for virus adsorption. Since certain insoluble salts efficiently adsorb viruses at pH values near neutrality, attempts have been made to use flocs trapped on filters to concentrate viruses from large volumes of water using flow-through systems. See U.S. Pat. Nos. 4,048,028; 3,816,304; Myagkii, Chem. Abs., Vol. 100, 161369a (1984); Hou, Chem. Abs., Vol. 100, 126947R (1984) and Homma et al, Chem. Abs., Vol. 83, 91749d (1975), Seeley and Primrose, J. Appl. Bac., Vol. 46, p. 103 (1979).

These attempts have been unsuccessful, however, because filters with large pores did not retain the flocs whereas filters with pores small enough to retain the flocs rapidly became clogged during the filtration procedure.

Gerba et al [J. Environ. Sci. Health, A23:41-58 (1988)] describes a system for inactivating bacteria in an aqueous medium by passing the latter through a filter constructed from a slurry of cellulose fibers and magnesium peroxide. This process and system, however, are limited to filters that have magnesium peroxide incorporated therein during the manufacturing process. There exists a need in the art for a system which permits modification of pre-formed filters to enhance their adsorptive capacity.

Silver and other heavy metals are effective antimicrobial agents and have been used in medicine for such purposes for many years. Conventionally, solutions of salts of the metals are applied topically to the area of treatment. A major disadvantage of this type of procedure is the requirement for frequent applications of the treating reagents.

Deitch et al, Antimicrob. Agents Chemother., Vol. 23, pp. 356-359 (1983) developed nylon coated with metallic silver for use as a bandage. Fabrics composed of silver nylon cloth have been found to possess antimicrobial activity in vitro and in vivo [Deitch et al, J. Trauma, Vol. 27, pp. 301-304 (1987)].

Geldreich et al, Jour. AWWA, Vol. 27, pp. 72-80 (1985) and Reasoner et al, J. AWWA, Vol. 79, pp. 60-66 (1987) studied several commercially available granular activated carbon (GAC) filters with and without impregnated silver; however, none of the products consistently provided water with low bacterial counts.

It is an object of the present invention to provide adsorbent materials having enhanced adsorptive properties which are not subject to the above-noted disadvantages and methods for their manufacture and methods for their utilization as adsorptive and antimicrobial materials.

SUMMARY OF THE INVENTION

The above and other objects are realized by the present invention which provides novel adsorbent materials having enhanced adsorptive characteristics produced by forming a stable association between the surface of the adsorbent material and a substantially water-insoluble polyvalent metal salt.

The present invention also provides an improved method of removing an unwanted impurity from an aqueous material wherein the aqueous material is contacted with a surface having an adsorptive capacity for the impurity; the improvement comprising contacting the aqueous material with the above-described adsorptive product, whereby the impurity is adsorbed by the surface.

DETAILED DESCRIPTION OF THE INVENTION

The present invention is predicated on the discovery that the adsorptive properties of adsorbent material surfaces are greatly enhanced where water-insoluble polyvalent metal salts are precipitated or formed in situ from an aqueous solution in contact with the adsorbent surfaces. The in situ precipitation or formation of the metal salt results in the formation of a stable association in the nature of a chemical bond between the polyvalent metal salt and the adsorbent surface.

The exact nature of the association between the polyvalent metal salt and the adsorbent surface is not presently known.

Since the salt is precipitated or formed in situ in the presence of the adsorbent material, it is formed and bonded to all surfaces of the adsorbent material rather than merely collected at the outer surfaces as is the case in those instances where attempts are made to trap flocs or gels thereof in the pores of adsorbent materials by filtration. The stable bond-like associations of the invention are not formed in these prior art methods or*any similar method where pre-formed salts are applied to the adsorbent surfaces. Thus, the in situ precipitation for formation step is critical to the success of the invention.

Since the polyvalent metal salt is present throughout the structure (i.e., pores, interstices, etc.) of the adsorbent material and since the thickness of the layers thereof can easily be controlled by varying the concentrations of the reactants required to produce the salt or the volume of solutions reacted to produce the precipitate, etc., the tendency of the salt to clog the pores of the adsorbent material is greatly reduced.

Moreover, the strong bond-like association between the salt and the adsorbent surface prevents removal of the salt during adsorption procedures, handling, washing, etc. A serious disadvantage associated with those adsorbers containing trapped pre-formed flocs or gels of salts is that they tend to become dislodged and wash away during filtering operations or become trapped in other pores thereby completely clogging portions of the filter and disrupting the flow therethrough of the liquid being treated.

Polyvalent metal salts in stable association with adsorbent surfaces have been formed to enhance the adsorptive capacity thereof for a wide variety of materials, e.g., viruses (bacteriophages, enteroviruses, rotaviruses), bacteria (gram positive, gram negative), proteins, including enzymes, mixtures of proteins from fetal calf serum and immunoglobulins from rabbits and metals such as iron, mercury, etc.

According to a further embodiment of the invention, the surfaces of materials which come into contact with tissue surfaces including, for example, skin, blood, etc; and with liquids which will ultimately contact such surfaces such as water can be rendered antimicrobial by forming an association between an antimicrobial such as silver, cadmium or mercury and the material surface.

The salts are preferably formed from polyvalent metals of Groups IB, IIA, IIB, IIIA, IVB, VIB, and VIII. Particularly preferred are iron, aluminum, lead, magnesium, silver, calcium and mixtures or alloys thereof.

The insoluble salt formed may comprise, e.g., hydroxides, phosphates, chromates, oxides, peroxides, etc.

Particularly preferred salts include ferric and ferrous hydroxides, aluminum hydroxides, magnesium hydroxide, oxide and peroxide, lead chromate and calcium hydroxide.

The adsorptive capacity of any adsorbent material may be enhanced by the method of the present invention, e.g., activated carbon, diatomaceous earth, cellulosic filters, e.g., filter paper, sawdust, etc., talc, filters composed of: fiberglass fibers bound by epoxy resin; nitrocellulose; diatomaceous earth; sand, etc.

For purposes of the present invention, the term "adsorbent material" will be understood to indicate any of the above listed materials as well as other conventional such materials but to exclude ion-exchange materials which depend upon an exchange of ions between the ion-exchange material and the solution containing the unwanted impurity in order to remove the undesired contaminant.

The method of the invention is preferably effected by reacting a substantially water-soluble salt of the polyvalent metal and a first anion with a substantially water-soluble compound comprising a cation and a second anion in an aqueous medium in contact with the adsorptive surface to form the precipitated salt of the polyvalent metal and the second anion in stable association with the adsorptive surface and a substantially water-soluble salt of the cation and the first anion.

Most preferably, the adsorptive surface is first intimately wetted with an aqueous solution of the salt of polyvalent metal and first anion. The adsorptive surface with adsorbed aqueous solution is thoroughly dried and subsequently wetted with an aqueous solution of the compound comprising the cation and the second anion whereby the precipitated polyvalent metal salt is formed in stable association with the adsorptive surface.

Alternatively, the adsorptive surface is first intimately wetted with an aqueous solution of the salt of polyvalent metal and first anion and subsequently contacted with vapors of a reactant material, i.e., ammonia, which, upon dissolution in the aqueous solution, forms the compound comprising the cation and second anion.

The adsorbent material containing precipitated salt is finally dried to produce a filter which may be used repeatedly in purification procedures. Surprisingly, it has been found that drying the filters does not deleteriously affect the stability of the bond between the salt and the adsorbent surface.

After the adsorptive material has had sufficient time to adsorb the soluble polyvalent metal salt, the material is removed from the solution. The support is drained of excess solution and either blotted dry or allowed to air dry overnight. Better results have been obtained using the latter drying procedure. The draining and drying steps are important in that they ensure that only solution that is tightly associated with the adsorptive material will be retained through these steps. Next, the dried adsorptive material is treated with a solution or vapors of the precipitate forming compound. Following precipitation with ammonia gas or ammonium hydroxide, the support material is allowed to dry and then washed with buffer or water before use. Following precipitation with an aqueous solution of precipitate forming compound, the material is washed with deionized water to remove residual base and dried. The resulting precipitate forms within and throughout the adsorptive material and is tightly bound to the surface and does not merely loosely coat the surface.

Where the salt to be formed in situ is an oxide, it is preferred to coat the adsorptive surface with a water-soluble polyvalent metal salt, preferably from an aqueous solution (followed by drying) and subsequently heating the coated substrate to convert the soluble salt to the water-insoluble polyvalent metal oxide. The temperature to which the soluble salt is heated to convert it to the oxide will depend, of course, upon the identity and nature of the water-soluble salt and is easily determinable by those skilled in the art without undue experimentation.

The oxide may be converted to the peroxide by contact with a solution of a peroxide, e.g., hydrogen peroxide, followed by drying. The peroxides, particularly magnesium peroxide, are valuable in the removal of bacteria since they also function to inactivate the bacteria which tend to proliferate in the filter, even after removal from the liquid to be purified.

It will be understood that the adsorptive capacity of adsorbent surfaces for a wide variety of impurities is enhanced by the present invention.

Where it is desired to remove viruses from aqueous media, the adsorber is preferably activated carbon, diatomaceous earth or a cellulosic filter containing in situ precipitated ferric hydroxide, aluminum hydroxide, lead chromate or mixtures thereof.

Where bacteria are intended to be removed, the absorber is preferably activated carbon, diatomaceous earth or cellulosic fiber containing an in situ precipitated mixture of ferric and magnesium hydroxides or with magnesium peroxide.

The same adsorbers containing in situ precipitated mixtures of ferric and magnesium hydroxides are also preferably used to remove certain proteins, e.g., mixtures of proteins from fetal calf serum or immunoglobulins from rabbit serum from aqueous solutions thereof.

The filter and method of the invention are also useful for the removal of metallic cations from solutions, e.g., copper, cadmium, lead, mercury, silver, etc. In some instances, the filters are also suitable for the removal of certain anions from solution, such as nitrate.

The invention is illustrated by the following non-limiting examples.

Where the filter or other material is to be rendered antimicrobial by the method of the invention, the particular metal employed will depend upon the application for which the treated material is intended. Bandages intended for covering wounds or catheter or tube surfaces intended for contact with blood or other bodily fluids or internal tissue surfaces may be modified such that the tissue surfaces exposed are in intimate contact with, e.g., silver which has been bonded to the bandage surface according to the method of the invention.

Diatomaceous earth, sand, microporous filters composed of cellulose or fiberglass, etc., that are intended for the filtration of water supplies may be treated in accordance with the present invention to provide a surface which will be antimicrobial as well as having an enhanced adsorptive capacity.

EXAMPLE 1

Viruses

Poliovirus-1, echovirus-5, and coxsackie B5 were grown on BGM cells and assayed as plaque-forming units using a methyl-cellulose overlay [Shields et al, Appl. Environ. Microbiol. 45:232–237 (1983)]. Harvests of virus-infected cultures were treated with freon (trichloro-trifluoro ethane) and the precipitate was removed by centrifugation at 14,000×g for 10 min. Bacteriophage MS2 was grown on *Escherichia coli* C-3000 (ATCC 15597) and assayed using a soft-agar overlay [Snustad et al, Genetics Experiments With Bacterial Viruses. W. H. Freemand and Co., San Francisco, Calif. (1971)].

Modification of Filters

Sheets (ca. 10×15 cm) of Whatman 3 mm filter paper (W & R Balston, Ltd., U.K.) were soaked in solutions of either: 1M $FeCl_3$; 1M $AlCl_3$; or 0.5M $FeCl_3$+0.5M $AlCl_3$ for one minute. The filters were drained of excess liquid and blotted with adsorbent paper towels. The filters were then placed in 1N NaOH for 15 to 30 sec. The filters were thoroughly rinsed with deionized water and dried at room temperature (ca. 25° C.) or at 35° C. The blotting step was essential since an excess amount of precipitate formed on filters that were not blotted. This excess precipitate was often sufficient to clog the filters. The drying step was also essential to ensure that the precipitate remained associated with the filters as water was passed through them. For controls, filters were either soaked in 1N NaOH, rinsed and dried in the same manner as were the treated filters, or used as untreated filters. Four or six layers of filters in 25-mm holders were used. The filters were rinsed with 50 ml of deionized water just before use to remove any precipitate that was not tightly bound to the filters.

Adsorption-elution Experiments

Viruses (ca. $10^5$ PFU/ml) were added to either tap water that had been dechlorinated by the addition of 1 ml/l of a 10% sodium thiosulfate solution or to buffer (0.02M imidazole+0.02M glycine). The tap water was adjusted to between 6.0 and 6.5 and the buffer was adjusted to pH 5.0, 7.0, or 9.0 by the addition of HCl of NaOH. One hundred ml of virus-containing solution was passed through the filters. Next, 10 ml of 3% beef extract, pH 9.5, was passed through the filters to elute adsorbed viruses. Viruses in the initial sample, the filter effluent, and in the filter eluate were assayed to determine the percent of virus adsorption and percent of virus recovery. The results are set forth in Tables 1, 2 and 3 wherein values represent the mean and range of duplicate determinations.

TABLE 1

Adsorption of viruses to cellulose filters modified by in situ precipitation of ferric and aluminum hydroxide[a]

| Solutions used to treat filters | Polio - 1 % Adsorbed | Polio - 1 % Recovered | MS2 % Adsorbed | MS2 % Recovered |
|---|---|---|---|---|
| Untreated control | 0 | 2 ± 2 | 4 ± 1 | 1 ± 1 |
| 1 N NaOH | 5 ± 3 | 6 ± 3 | 0 | 0 |
| 1M $AlCl_3$ + 1 N NaOH | 7 ± 1 | 1 ± 1 | 1 ± 1 | 1 ± 1 |
| 1M $FeCl_3$ + 1 N NaOH | 58 ± 10 | 61 ± 7 | 44 ± 4 | 41 ± 6 |
| 0.5M $FeCl_3$ and 0.5M $AlCl_3$ + 1 N NaOH | 50 ± 8 | 45 ± 4 | 99 ± 1 | 68 ± 10 |

[a]The numbers of viruses in the beef extract eluate and in the effluent from the filter were compared with the number in the initial sample to determine the percent adsorbed and recovered.

TABLE 2

Concentration of viruses from tapwater using cellulose filters modified by in situ precipitation of ferric and aluminum hydroxide[a]

| Virus | Filters with ferric and aluminum hydroxide[b] Adsorbed | Filters with ferric and aluminum hydroxide[b] Recovered | Untreated filters Adsorbed | Untreated filters Recovered |
|---|---|---|---|---|
| Polio-1 | 84 ± 8 | 86 ± 9 | 0 | 0 |
| Echo-5 | 43 ± 5 | 34 ± 3 | 3 ± 2 | 4 ± 1 |
| Coxsackie B5 | 34 ± 5 | 37 ± 4 | 7 ± 1 | 4 ± 1 |
| MS2 | 87 ± 1 | 46 ± 1 | 12 ± 5 | 0 |

[a]The procedure described in Table 1 was used except that six layers of filter were used.
[b]The filters were treated with a solution containing 0.5M ferric chloride and 0.5M aluminum chloride as described above.

TABLE 3

Influence of pH on adsorption of viruses to cellulose filters modified by in situ precipitation of ferric and aluminum hydroxide[a]

| Virus | pH | Filters with ferric and aluminum hydroxide[b] | | Untreated filters | |
|---|---|---|---|---|---|
| | | Adsorbed | Eluted | Adsorbed | Eluted |
| Polio-1 | 5 | 88 ± 3 | 81 ± 1 | 8 ± 5 | 9 ± 5 |
| | 7 | 86 ± 1 | 89 ± 1 | 10 ± 5 | 1 ± 1 |
| | 9 | 6 ± 3 | 7 ± 4 | 7 ± 6 | 0 |
| MS2 | 5 | 96 ± 1 | 56 ± 15 | 6 ± 2 | 1 ± 1 |
| | 7 | 100 | 66 ± 5 | 3 ± 22 | 4 ± 1 |
| | 9 | 9 ± 1 | 5 ± 4 | 2 ± 1 | 2 ± 2 |

[a] One hundred ml of buffer (0.02M glycine + 0.02M imidazole) with ca. $10^5$ PFU/ml of the indicated virus was passed through 6 layers of the filter in 25-mm holders at ca. 1 ml/sec. Next, 10 ml of 3% beef extract, pH 9.5, was passed through the filters. The numbers of viruses in the beef extract eluates and in the effluents from the filters were compared with the number in the buffer before filtering to determine the percent adsorbed and recovered.

[b] The filters were treated with a solution containing 0.5M ferric chloride and 0.5M aluminum chloride as described above.

As shown in Table 1, untreated filters, filters that had been treated with base alone, and filters that had been modified in situ precipitation of aluminum chloride adsorbed less than 7% of either polio 1 or MS2. Filters formed by in situ precipitation of ferric chloride adsorbed 58% of polio 1 and 44% of MS2. By using a combination of 0.5M ferric chloride and 0.5M aluminum chloride, the adsorption of MS2 was increased to 99% and the adsorption of polio 1 was only slightly decreased to 50%. Therefore, subsequent tests were carried out with filters formed by in situ precipitation of a combination of 0.5M ferric chloride and 0.5M aluminum chloride.

Increasing the number of filters from four to six increased the amount of polio 1 that was adsorbed and recovered by modified filters (Table 2). Echo 5 and coxsackie B5 were not adsorbed or recovered by the modified filters as well as was polio 1. Although MS2 adsorbed well to six layers of filters, only 46% could be recovered. Untreated filters adsorbed 12% or less of the four viruses.

At pH 5 and 7, both polio 1 and MS2 were adsorbed efficiently by filters formed by in situ precipitation of ferric and aluminum chloride (Table 3). However, less than 10% of the viruses adsorbed to the filters at pH 9. Untreated filters did not adsorb more than 10% of the viruses at any pH value.

It has further been found that diatomaceous earth or granular activated carbon modified by in situ precipitation of a combination of ferric and magnesium hydroxides adsorbs the bacterium Escherichia coli. Untreated control samples and adsorbers treated with other precipitates such as ferric hydroxide alone or ferric and calcium hydroxide adsorb only a small percentage of the total bacteria.

Diatomaceous earth modified by the in situ precipitation of ferric and magnesium hydroxides adsorbs greater than 90% of the protein in a solution of fetal calf serum; untreated diatomaceous earth adsorbs less than 5% of the protein under the same conditions.

EXAMPLE 2

Viruses were prepared and assayed as described in Example 1.

Flat sheets of Millipore HA (Millipore Corp., Bedford, Mass.), Filterite 0.25 (Filterite Corp., Timmonium, Md.), and AP20 (Millipore) filters were soaked in solutions of $FeCl_3$, $AlCl_3$, $CaCl_2$, and $MgCl_2$. The combinations and concentrations of salts used are set forth in Table 4 below. After soaking for ca. 1 min., the filters were removed, allowed to drain, and dried at 35° C. overnight. The filters were then placed in 1N ammonium hydroxide for 1 min. The filters were removed from the ammonium hydroxide solution, drained, and dried overnight at 35° C. The filters were then cut into 25-mm discs.

Granular activated carbon (Matheson-Coleman-Bell, Inc.) was soaked in solutions of ferric chloride, calcium chloride, or magnesium chloride for one week. The combinations and concentrations of salts used are set forth in Table 5 below. The carbon was removed from the solutions, dried overnight at 35° C., and then soaked for 48 hrs. in 5N ammonium hydroxide. The carbon was removed from the ammonium hydroxide solution and dried overnight at 35° C.

Diatomaceous earth (Sigma Corp., St. Louis, Mo.) was mixed with solutions of ferric chloride, aluminum chloride, calcium chloride, or magnesium chloride for 30 min. The combinations and concentrations of salts used are set forth in Tables 6, and 7 and 8 below. The diatomaceous earth was collected by centrifugation at ca. 500×g, mixed with 3N ammonium hydroxide for 30 min. and centrifuged again. The supernatant was discarded and the earth dried overnight at 35° C.

Adsorption-elution tests with the above-described filters were carried out as described in Example 1 except that 50 ml volumes of buffer were used.

Fifty ml centrifuge tubes containing 0.5 g of granular activated carbon and 10 ml of buffer with virus were placed on a rotating shaker for 30 min. The tubes were centrifuged at ca. 500×g, the supernatant fractions were removed and assayed for viruses. Next, 10 ml of 3% casitone, pH 9.3, was added to the tubes and shaken for 5 min. The tubes were centrifuged as described above and the casitone eluate assayed for viruses. Viruses in buffer with carbon were assayed at the beginning and at the end of the tests; the average of these values was taken as 100%.

Adsorption-elution tests with diatomaceous earth were carried out as described for carbon except that 20 ml of buffer was used for the adsorption step and 20 ml of brain-heart infusion broth was used for the elution step.

Poliovirus 1 adsorption to untreated Millipore, Filterite and AP20 filters was minimal at pH 7 (Table 4). Treating filters by in situ precipitation of metallic hydroxides significantly increased their ability to adsorb virus.

Bacteriophage MS2 adsorbed better to granular activated carbon that had been treated by in situ precipitation of ferric, calcium, and magnesium hydroxides (Table 5). Adsorption of soluble salts by carbon was relatively slow and up to one week of soaking was required before sufficient salts were adsorbed. Longer contact with ammonium hydroxide was also required.

Although less than 10% of poliovirus 1 or MS2 adsorbed to untreated diatomaceous earth, greater than 70% of these viruses adsorbed to diatomaceous earth that had been treated in situ precipitation according to the present invention. In situ precipitation of metallic salts increased the weight of diatomaceous earth by ca. 30%. This increase was observed after the treated diatomaceous earth had been washed with water, indicating that the association between the precipitate and the diatomaceous earth was stable in aqueous solutions.

Both gram negative (*Escherichia coli*) and gram positive (*Streptococcus faecalis*) bacteria adsorbed to untreated diatomaceous earth (Table 7). However, this adsorption was increased when diatomaceous earth that had been treated by in situ precipitation of metallic salts was used.

Most of a mixture of proteins from fetal calf serum was adsorbed to diatomaceous earth modified by in situ precipitation of metallic salts (Table 8). In contrast, little protein adsorbed to untreated diatomaceous earth. Similar results were obtained when immunoglobulins against bacteriophage MS2 from rabbits were used. Treated diatomaceous earth removed neutralizing antibodies from a solution of rabbit serum in phosphate-buffered saline. Untreated diatomaceous earth did not reduce the neutralizing capacity of the solutions, indicating that immunoglobulins were not adsorbed.

TABLE 4

Adsorption of poliovirus 1 to microporus filters[a]

| Soluble salt used | Percent virus adsorption to: | | |
|---|---|---|---|
| to treat filters[b] | Millipore | Filterite | AP20 |
| None | 7 ± 6[c] | 9 ± 9 | 36 ± 9 |
| 0.25M FeCl$_3$ | 41 ± 5 | 30 ± 12 | 44 ± 12 |
| 0.25M FeCl$_3$ + 1.0M AlCl$_3$ | 51 ± 2 | 98 ± 1 | 89 ± 1 |
| 0.25M FeCl$_3$ + 1.0M CaCl$_2$ | 38 ± 2 | 91 ± 7 | 68 ± 14 |
| 0.25M FeCl$_3$ + 1.0M MgCl$_2$ | 92 ± 3 | 94 ± 4 | 93 ± 2 |

[a]Fifty ml of buffer (0.02M glycine + 0.02M imidazole) at pH 7 with ca. 10$^5$ PFU/ml of virus was passed through one layer of Millipore or four layers of the other filters in 25-mm holders at ca. 1 ml/sec. The numbers of viruses in the filter effluents were compared with the numbers in the initial samples to determine the percentage of virus adsorption.
[b]Following treatment with the soluble salt, the filters were dried, treated with 1 N ammonia hydroxide, dried again, and cut into 25-mm circles.
[c]Values represent the mean and range of duplicate determinations.

TABLE 5

Adsorption of bacteriophage MS2 to granular activated carbon[a]

| Soluble Salt used | Percent of virus: | |
|---|---|---|
| to treat carbon[b] | Adsorbed | Eluted |
| None | 12 | 4 |
| 0.5M FeCl$_3$ + 6.0M CaCl$_2$ | 100 | 43 |
| 0.5M FeCl$_3$ + 1.0M MgCl$_2$ | 70 | 31 |

[a]Treated or untreated granular activated carbon (Matheson-Coleman-Bell, 0.5 g) was mixed with 10 ml of buffer (0.02M glycine + 0.02M imidazole, pH 7) containing ca. 10$^5$ PFU/ml of virus in 50 ml centrifuge tubes for 30 min. on a rotating shaker. The tubes were centrifuged at ca. 500 × g for 5 min. The supernatants were removed and 10 ml of 3% casitone, pH 9.3, was added. The tubes with carbon and casitone were mixed for 5 min. and centrifuged as described above. The numbers of viruses in the supernatant fractions, the casitone eluates and in control samples of buffer that had not been exposed to carbon were compared to determine the percent of virus adsorption and recovery.
[b]Following soaking in the soluble salt for one week, the carbon samples were dried at 35 degrees C. The samples were then placed in 5 N ammonium hydroxide for 48 hrs. Next the samples were dried at 35 degrees C.

TABLE 6

Adsorption of viruses to diatomaceous earth[a]

| Soluble salt used to treat diatomaceous earth[b] | Poliovirus 1 | | Bacteriophage MS2 | |
|---|---|---|---|---|
| | % adsorbed | % eluted | % adsorbed | % eluted |
| None | 7 ± 7[c] | 1 ± 2 | 3 ± 1 | 5 ± 1 |
| 1M MgCl$_2$ | 97 ± 1 | 61 ± 4 | 100 | 74 ± 3 |
| 0.5M FeCl$_3$ + 1.0M MgCl$_2$ | 100 | 82 ± 6 | 98 ± 1 | 45 ± 3 |
| 0.5M FeCl$_3$ + | 70 ± 5 | 31 ± 1 | 100 | 39 ± 3 |
| 1.0M CaCl$_2$ | | | | |

[a]Treated or untreated diatomaceous earth (Sigma, 0..5 g) was mixed with 20 ml of buffer (0.02M glycine + 0.02M imidazole, pH 7) containing ca. 10$^5$ PFU/ml of virus in 50 ml centrifuge tubes for 30 min. on a rotating shaker. The tubes were centrifuged at ca. 500 × g for 5 min. The supernatants were removed and 20 ml of 3% brain-heart infusion (BHI) pH 9, was added. The tubes with diatomaceous earth and BHI were mixed for 5 min. and centrifuged as described above. The numbers of viruses in the supernatant fractions, the BHI eluates and in control samples of buffer that had not been exposed to diatomaceous earth were compared to determine the percent of virus adsorption and recovery.
[b]Following soaking in the soluble salt, the diatomaceous earth samples were dried at 35 degrees C. The samples were then placed in 3 N ammonium hydroxide. Next, the samples were dried at 35 degrees C.
[c]Values represent the mean and range of duplicate determinations.

TABLE 7

Adsorption of bacteria to diatomaceous earth[a]

| Soluble salt used to treat diatomaceous earth[b] | Escherichia coli | | Streptococcus faecalis | |
|---|---|---|---|---|
| | % adsorbed | % eluted | % adsorbed | % eluted |
| None | 59 | 7 | 69 | 3 |
| 0.5M FeCl$^3$ + 1.0M AlCl$_3$ | 100 | 8 | 93 | 24 |
| 0.5M FeCl$_3$ + 1.0M CaCl$_2$ | 100 | 64 | 92 | 24 |
| 0.5M FeCl$_3$ + 1.0M MgCl$_2$ | 100 | 35 | 90 | 9 |

[a]Treated or untreated diatomaceous earth (Sigma, 0..5 g) was mixed with 20 ml of buffer (0.02M glycine + 0.02M imidazole, pH 7) containing ca. 20$^5$ PFU/ml of bacteria in 50 ml centrifuge tubes at 500 × g for 5 min. The supernatants were removed and 20 ml of 3% brain-heart infusion (BHI) pH 9, was added. The tubes with diatomaceous earth and BHI were mixed for 5 min. and centrifuged as described above. The numbers of bacteria in the supernatant fractions, the BHI eluates and in control samples of buffer that had not been exposed to diatomaceous earth were compared to determine the percent of bacterial adsorption and recovery.
[b]Following soaking in the soluble salt, the diatomaceous earth samples were dried at 35 degrees C. The samples were then placed in 3 N ammonium hydroxide. Next, the samples were dried at 35 degrees C.

TABLE 8

Adsorption of protein to diatomaceous earth[a]

| Soluble salt used to treat diatomaceous earth[b] | Percent of protein adsorbed[c] |
|---|---|
| None | 6 ± 5 |
| 0.5M FeCl$_3$ + 0.5M MgCl$_2$ | 72 ± 4 |
| 6.0M CaCl$_2$ | 90 ± 4 |

[a]Treated or untreated diatomaceous earth (Sigma 0.5 g) was mixed with 20 ml of buffer (0.02M glycine ± 0.02M imidazole, pH 7) containing ca. 100 mg/l of protein from fetal calf serum in 50 ml centrifuge tubes for 30 min. on a rotating shaker. The tubes were centrifuged at ca. 500 × g for 5 min. The supernatants were removed. The concentration of protein in the supernatant fractions and in control samples of buffer that had not been exposed to diatomaceous earth were compared to determine the percent of protein adsorption.
[b]Following soaking in the soluble salt, the diatomaceous earth samples were dried at 35 degrees C. The samples were then placed in 3 N ammonium hydroxide. Next, the samples were dried at 35 degrees C.
[c]Values represent the mean and range of duplicate determinations.

EXAMPLE 3

Sawdust was obtained from pine boards and plywood and was treated by soaking in a solution of 0.5M ferric chloride+1.0M magnesium chloride for 24 hrs. The sawdust was then drained and dried for 24 hrs at 35° C. The dried sawdust was mixed with 1N ammonium hydroxide for 24 hrs, drained and dried for another 24 hrs at 35° C.

Twenty ml of buffer (0.02M glycine+0.02M imidazole, pH 7) was seeded with ca. 10$^6$ PFU/ml of bacteriophage MS2 virus and mixed with one gram of treated or untreated sawdust and shaken on a rotating shaker for 30 min. The samples were centrifuged for 10 min. at ca. 15,000×g. The supernatant fractions were removed and assayed for virus. The samples were mixed with 20 ml of 3% beef extract, pH 9, for five minutes and centrifuged as described above. Virus eluted by the beef extract was assayed. Virus in samples of buffer that was not exposed to sawdust was assayed at the beginning and at the end of the experiment.

The results are set forth in Table 9.

TABLE 9

Adsorption of Bacteriophage MS2 by Sawdust[a]

| Sample | Percent of initial virus adsorbed | Percent of initial virus eluted |
|---|---|---|
| Sawdust treated by in situ precipitation of 0.5M FeCl$_3$ + 1.0M MgCl$_2$ | 98 ± 1 | 57 ± 4 |
| Untreated sawdust | 3 ± 2 | 10 ± 1 |

[a]Values represent the mean and range for duplicate determinations.

Scanning electron microscopy combined with X-ray analysis have been employed to examine untreated filters and filters modified by the in situ precipitation of ferric hydroxide alone or in a combination of ferric and aluminum or magnesium hydroxides. Precipitates are clearly visible on the fibers and at the junctions of fibers of modified but not of unmodified filters. Of particular interest are sections of filters that are cut perpendicular to the plane of the filters to show the inner cross-section of the individual fibers. X-ray analyses of these sections clearly show that iron atoms are deposited within the fibers. Also, light microscopic examinations of fibers cut perpendicular to the plane of the filter show the brown precipitation characteristics of ferric precipitates. These results clearly show that more than entrapment of flocs occurs as a result of the method of the invention.

Electron microscopic examination of unmodified diatomaceous earth shows the presence of many diatoms. The even pore structure of many of these diatoms is clearly evident. In contrast, similar examinations of modified diatomaceous earth show that the diatoms are covered with a layer of precipitate in close association with the diatoms and not merely as a loose covering.

BRIEF DESCRIPTION OF THE DRAWINGS

As shown in FIG. 1, coprecipitation of ferric and aluminum hydroxides produce morphologically different precipitates on filters. It is likely that the ferric hydroxide precipitates form a more stable association with the fibers and the aluminum hydroxide precipitates bind to the ferric hydroxide precipitates.

EXAMPLE 4

Figure 1A:
FIG. 1 is a scanning electron micrograph of untreated cellulose note FIG. 1A and scanning electron micrographs of cellulose treated by in situ precipitation of ferric and aluminum hydroxides note FIGS. 1B, 1C and 1D ((X 970 (A,B,D) or X 180 (C)). Flat, darker precipitates contain iron atoms only; lighter, round precipitates contain iron and aluminum atoms.
Figure 1B:
Figure 1C:
Figure 1D:
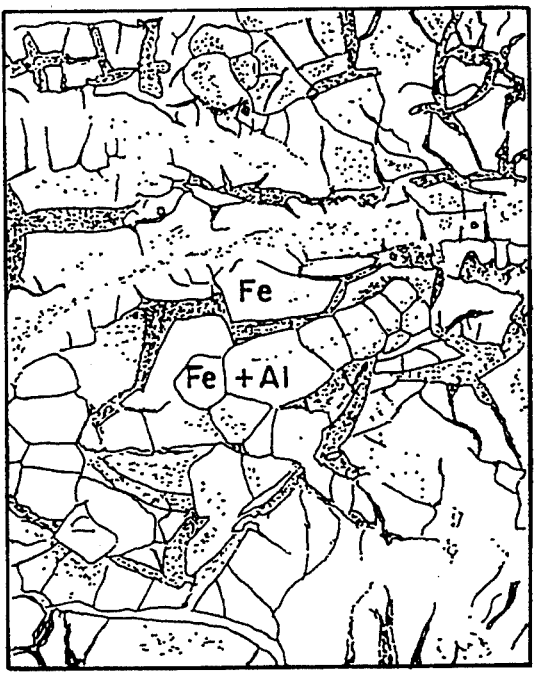

Described below are procedures for incorporating insoluble oxides and peroxides on adsorptive surfaces.

Diatomaceous earth or sand was mixed with a solution of salt(s) for 30 min. Solutions containing ferric chloride, calcium, chloride, magnesium chloride, and aluminum chloride were used, either alone or in combinations. For formation of peroxides, 2M magnesium chloride was employed. Samples with diatomaceous earth were centrifuged and the supernatant fractions removed: samples with sand were allowed to settle and the supernatant fractions were poured off. The remaining solids were dried at 37° C.

The dried solids were heated in crucibles using a bunsen burner. Heating was continued until no fumes or smell characteristic of hydrochloric acid were observed to come from the solid. Untreated diatomaceous earth or sand were heated for the same length of time.

Approximately 20 grams of substrate-oxide were mixed with 50 to 100 ml of 50% hydrogen peroxide; the reaction with diatomaceous earth is violent and is completed after 1 hr; the reaction with sand is slower and is allowed to proceed overnight. The solids were removed from the hydrogen peroxide solution by centrifugation (diatomaceous earth) or by settling (sand) and allowed to dry at 37° or 105° C.

The formation of stable peroxides was determined by mixing the solid with a solution of potassium iodide. Iodine liberated was detected using starch indicator.

Viruses or bacteria were added to dechlorinated tapwater at ambient pH (approximately pH 8). The seeded tapwater was passed through treated or untreated diatomaceous earth in 25-mm filter holders. The diatomaceous earth was retained with fiberglass filters. The virus/bacteria in the initial water samples and in the filter effluent samples were measured.

Viruses/bacteria that were adsorbed or removed by mechanical filtration are recovered by treating the diatomaceous earth with a solution of 3% beef extract. This was done for one set of filters immediately after the water sample had been passed through them. Another set of filters was sealed with paraffin to reduce evaporation following filtration of the water with virus or bacteria. These filters were maintained at room temperature (approximately 25° C.) for 24 hrs. At this time, the virus/bacteria were recovered using beef extract as in the case for the first set of filters. Adsorption of viruses to untreated diatomaceous earth with metallic oxides or diatomaceous earth with magnesium peroxide, and their subsequent recovery in beef extract, are shown in Tables 10 and 11.

Results of studies on the removal of *Escherichia coli* from water are shown in Table 12 (three determinations).

Three determinations are of interest. These are the amount of bacteria/virus removed from tapwater, the amount recovered in the initial elution step, and the amount that can be recovered after 24 hrs.

TABLE 10

Adsorption of Viruses by Metallic Oxides

| Metal used to form the oxide | Phage MS2 | |
|---|---|---|
| | % adsorbed | % recovered |
| None - control | 13 | 2 |
| Aluminum | 88 | 41 |
| Calcium | 45 | 1 |
| Magnesium | 99 | 90 |
| Iron | 2 | 2 |
| Iron + aluminum | 99 | 84 |
| Iron + calcium | 14 | 1 |
| Iron + magnesium | 88 | 60 |

TABLE 11

| Adsorption of Viruses to Diatomaceous Earth (DE) | | |
|---|---|---|
| Filter | Percent adsorption: | |
| material | MS2 | P1 |
| Untreated DE | 21 | 79 |
| DE + magnesium oxide | 99 | 99 |
| DE + magnesium peroxide | 82 | 96 |

TABLE 12

| Inactivation of Bacteria by Diatomaceous Earth (DE) | | | |
|---|---|---|---|
| | Percent *Escherichia coli*: | | |
| Filter material | Removed from water | Recovered at 0 hrs | Recovered at 24 hrs |
| Untreated DE | >99 | 60 | 42 |
| DE + magnesium peroxide | >99 | 28 | <0.01 |

EXAMPLE 5

Cryptosprodiium oocysts were diluted in tapwater. The tapwater with added oocysts was passed through small columns containing untreated sand or sand that had been modified by in situ precipitation of ferric chloride and magnesium chloride. Oocysts in the initial sample of seeded tapwater and in the column effluents were determined by microscopic counting. Although columns with both types of sand removed some oocysts, removal by columns with modified sand was greater and more consistent. See Table 13. In two cases (Trials 4 and 5), no oocysts were detected in the column effluents.

TABLE 13

| Solution used to modify sand | Percent of oocysts removed: | | | | | Standard Mean deviation |
|---|---|---|---|---|---|---|
| | Trial 1 | Trial 2 | Trial 3 | Trial 4 | Trial 5 | |
| None | 34 | 98.6 | 33 | 84 | 84 | 66.7 ± 27.6 |
| 1M FeCl$_3$ + 1M MgCl$_2$ | 98 | 99.6 | 98 | >99.8 | >99.8 | 99.0 ± 0.9 |

*From 15 to 35 ml of tapwater with 2 × 10$^4$ Cryptosporidium oocysts was passed through columns containing 6 to 23 ml of untreated or modified sand. Oocysts were determined by microscopic examination.

Solids modified by the in situ precipitation of metallic salts were also found to remove cations and anions from water. Copper, cadmium, lead, mercury, and silver cations were removed from water by filters containing modified cellulose filters, diatomaceous earth, or sand. Untreated solids removed only small amounts or none of these cations. Modified diatomaceous earth was also found to remove an anion (nitrate) from water.

EXAMPLE 6

Cellulose filters (Whatman #1) diatomaceous earth (Sigma type 1), and fine sand (100 mesh) were used. Cellulose filters were contained in 25- or 47-mm filter holders. Diatomaceous earth was layered on AP-20 fiberglass prefilters (Millipore) in 25- and 47-mm holders. Sand was contained in polyvinyl chloride columns and was supported by glass fiber.

Sheets (ca. 10 by 15 cm) of cellulose filters were soaked in solutions of metallic salts for 5 min. The sheets were removed from the solutions, blotted on paper towels, and dried at 35° C. The dried sheets were then placed in 3N ammonium hydroxide for One minute, and dried again at 35° C. before use. Diatomaceous earth and sand were mixed with solutions of metallic salts (4 ml of solution/1 g of solid) on a rotating shaker for 30 min. The diatomaceous earth was removed from the solutions by centrifugation at 500×g for 5 min and the sand was allowed to settle before the solutions were removed. The solids were then dried at 35° C. The solids were then mixed with 3N ammonium hydroxide (at the ratio of 4 ml/g of solid) for 5 min. The solids were collected by centrifugation or settling as described above, and dried to remove the ammonium hydroxide.

Metallic salts were added to tapwater that had been adjusted to pH 5 to 6 with 1N HCl. The pH was adjusted to prevent flocculation of metallic salts that occurred at pH values greater than 7. Sodium nitrate was added to tapwater at the ambient pH of approximately pH 8.5. The specific salts used and the concentrations of the metals are given in the Tables. Samples of water with added metallic salts were passed through filters at approximately 1 ml/sec. Except where indicated in the text, 100 ml volumes were used. Metals in the initial samples and in the effluents were measured. Results presented represent the mean of duplicate experiments or typical results from several experiments.

Metals in solution were determined using a Jartell Ash Model 9000 inductively coupled argon plasma spectophotometer or by Particle-Induced X-ray Emission (PIXE). For PIXE analysis, liquid samples were deposited onto aluminized mylar backing and analyzed with 2.5 MeV protons from a 4 MV Van de Graaff accelerator. The X-rays were detected in a Kevex Si(Li) detector located inside the irradiation chamber. Copper was also assayed in an oxidation-reduction procedure using potassium iodide (Pierre et al (1958) *Quantitative Analysis*, John. Wiley & Sons, New York).

The method of modification greatly influenced removal of copper by Whatman filters and diatomaceous earth. Filters modified by combinations of ferric chloride and either magnesium chloride or calcium chloride were the most effective in removing copper from water. Filters of diatomaceous earth modified by these same combinations of salts or by magnesium chloride alone were also effective in removing greater than 50% of the copper in water. See Table 14.

PIXE analyses of water seeded with metals before and after passage through a series of two diatomaceous earth filters in series were conducted. Following passage through the filter, peaks produced by copper, cadmium, and mercury are eliminated and major peaks produced by calcium and smaller peaks produced by iron are present. The peaks representing bromine and zinc are likely part of the material used to hold samples.

Filters containing modified Whatman filters or diatomaceous earth were able to remove several metals from water (Table 15). The concentrations of cadmium, lead, mercury, and silver were all greatly reduced following passage through the filters.

Columns containing sand modified by in situ precipitation were more effective in removing copper from water than were similar columns containing unmodified sand (Table 16). Increasing the length of the columns and the amount of sand increased the amount of copper removed.

As shown in Table 17, unmodified diatomaceous earth removed little nitrate from water; in contrast, modified diatomaceous earth reduced the nitrate level to less than 10% of that in the water before filtering.

TABLE 14

Removal of copper by Whatman #1 filters and diatomaceous earth modified by in situ precipitation*

| Material | Solution used for modification | Percent copper removed |
|---|---|---|
| Whatman #1 filters | None | <0.1 |
| | 1M $CaCl_2$ | 28 |
| | 1M $MgCl_2$ | 22 |
| | 1M $FeCl_3$ | 4 |
| | 1M $FeCl_3$ + 1M $CaCl_2$ | 80 |
| | 1M $FeCl_3$ + 1M $MgCl_2$ | 84 |
| Diatomaceous earth | None | 16 |
| | 1M $CaCl_2$ | 18 |
| | 1M $MgCl_2$ | 66 |
| | 1M $FeCl_3$ | 21 |
| | 1M $FeCl_3$ + 1M $CaCl_2$ | 52 |
| | 1M $FeCl_3$ + 1M $MgCl_2$ | 73 |

*One hundred ml samples of tapwater at approximately pH 5 with 25 mg/l of copper (as copper chloride) were passed through six layers of Whatman #1 filters or 1.5 g of diatomaceous in 47-mm holders.

TABLE 15

Removal of metals by Whatman #1 filters and diatomaceous earth modified by in situ precipitation*

| Filter material | Solution used for modification | Metal | Tapwater | Filter effluent | Percent Removed |
|---|---|---|---|---|---|
| Whatman #1 | 1M $FeCl_3$ + 1M $CaCl_2$ | Cadmium | 22.15 | 2.01 | 91 |
| Whatman #1 | 1M $FeCl_3$ + 1M $MgCl_2$ | Cadmium | 22.15 | 2.46 | 89 |
| Whatman #1 | 1M $FeCl_3$ + 1M $CaCl_2$ | Lead | 36.62 | 0.33 | 99 |
| Whatman #1 | 1M $FeCl_3$ + 1M $MgCl_2$ | Lead | 36.62 | 0.58 | 98 |
| Diatomaceous earth | 1M $FeCl_3$ + 1M $CaCl_2$ | Cadmium | 44.1 | <0.1 | >99 |
| Diatomaceous earth | 1M $FeCl_3$ + 1M $CaCl_2$ | Mercury | 148 | <0.1 | >99 |
| Diatomaceous earth | 1M $FeCl_3$ + 1M $CaCl_2$ | Lead | 63.4 | <0.1 | >99 |
| Diatomaceous earth | 1M $FeCl_3$ + 1M $CaCl_2$ | Silver | 78 | <0.1 | >99 |

(g/ml of metal in columns: Tapwater, Filter effluent)

*One hundred milliliter samples of tapwater with the indicated metal, as cadmium sulfate, lead nitrate, mercuric chloride, and silver nitrate were passed through 47-mm filters containing 8 layers of Whatman filters or a series of one 25-mm and one 47-mm filter in tandem with diatomaceous earth.

TABLE 16

Removal of copper from tapwater by sand modified by in situ precipitation*

| Solution used for modification | Amount of sand | Volume of tapwater (ml) | Percent copper removed |
|---|---|---|---|
| None | 25 | 300 | 6 |
| 1M FeCl | 25 | 300 | 53 |
| 1M $FeCl_3$ + 1M $MgCl_2$ | 25 | 300 | 72 |
| None | 200 | 1500 | 36 |
| 1M $FeCl_3$ | 200 | 1500 | >99 |
| 1M $FeCl_3$ + 1M $MgCl_2$ | 200 | 1500 | >99 |

*The indicated volumes of tapwater at pH 5 to 6 with 25 mg/l of copper (as copper chloride) were passed through 5 × ¾ in. columns containing 25 g of sand or 15 × ¾ in. columns containing 200 g of sand.

TABLE 17

Removal of nitrate by diatomaceous modified by in situ precipitation*

| Solution used for modification | Percent nitrate removal |
|---|---|
| None | <1 |
| 1M $FeCl_3$ + 1M $MgCl_2$ | 93 |

*Fifty ml of tapwater at ambient pH (approximately pH 8.5) with 3 mg/l of sodium nitrate were passed through 1.5 g of diatomaceous earth contained in 47-mm holders.

The following examples illustrate the preparation of surfaces having antimicrobial properties. The antimicrobial surfaces also have enhanced adsorptive properties.

This combination of properties enables the fabrication, for example, of water filters on which the growth of bacteria and the subsequent contamination of water filtered therethrough (a problem associated with conventional water filters) is greatly inhibited.

Antimicrobial surfaces may be prepared according to one of two general methods.

The first method involves the preparation of an adsorptive surface according to one of the methods described in the preceding examples. The adsorptive surface is then contacted with a solution of the antimicrobial cations (Ag, Hg, Cd). The cations are adsorbed onto the surface and are then available for antimicrobial duty.

The second method involves exposing the surface to be modified to a solution containing ions of the antimicrobial metal. The surface is then exposed to a solution that will result in a precipitation of an antimicrobial metal salt on the surface or within the solid. The method of preparation can be reversed. A surface can be exposed to a soluble solution containing an anion that will precipitate the desired antimicrobial cation. The solid can then be exposed to a solution containing a soluble salt of the desired cation. For example, a surface or solid can be exposed to sodium chloride, dried, and then exposed to a solution of silver nitrate. The resulting silver chloride precipitate will be retained by the surface or solid.

EXAMPLE 7

Celluose filters (Whatman #1), fiberglass filters (Filterite), diatomaceous earth, and gauze or non-stick bandages (Eckerd, Curity, Johnson & Johnson), were soaked for 20 min. in a solution containing 1, 2, or 4M magnesium chloride or manganese chloride. Other salts of magnesium and manganese, such as the nitrate or sulfate can also be used. Polyvinyl chloride tubing (Tygon) was heated in the same solutions for 20 min. The solids were removed from the solutions, dried at 35° C., and then placed in 3N ammonium hydroxide for 5 min. The solids were rinsed in deionized water, dried at 35° C., and then mixed with a solution of 0.01 or 0.1N silver nitrate, mercuric chloride, or cadmium sulfate. Solids treated with manganese solutions generally turned black in the presence of silver nitrate. This suggests that the manganese and silver were participating in an oxidation-reduction reaction.

EXAMPLE 8

Cellulose filters (Whatman #1), fiberglass filters (Filterite), diatomaceous earth, and gauze or non-stick bandages (Eckerd, Curity, Johnson & Johnson), were soaked for 20 min in a solution containing 0.01 or 0.1N silver nitrate. Polyvinyl chloride tubing (Tygon) was heated in the same solutions for 20 min. The solids were removed from the solutions, dried at 35° C., and then mixed with 1N sodium chloride or 0.1N sodium pyrophosphate. The solids were rinsed in deionized water and dried. The order of treatment with the solutions can be reversed. The solids to be modified can be exposed to a solution such as 1M sodium chloride or 0.1M sodium pyrophosphate, dried, and then exposed to a solution of 0.01 or 0.1M silver nitrate.

Table 18 sets forth the results of several studies of the antibacterial properties of filters prepared according to the methods of Examples 7 and 8. The data given for one day of use, following one for more than one week since little variance in results was observed over time.

Fifty ml of tap water was passed through each filter in 25 mm holders. Bacteria in the tap water and in the filter effluents were measured and compared.

TABLE 18

| Filter material | Solution used for in situ precipitation | Salt used for second modification step | Bacteria in influent tap water CFU/ml | Bacteria in filter effluent CFU/ml | (Bacteria in effluent from unmodified filters/ bacteria in effluent from modified filters) × 100% |
| --- | --- | --- | --- | --- | --- |
| Diatomaceous earth | None | None | $1.3 \times 10^1$ | $1.9 \times 10^4$ | |
| | $MgCl_2 + NH_4OH$ | $AgNO_3$ | $1.3 \times 10^1$ | 5 | 0.02 |
| | $MgCl_2 + NH_4OH$ | $HgCl_2$ | $1.3 \times 10^1$ | 11 | 0.06 |
| Cellulose | None | None | $4.1 \times 10^2$ | $6.6 \times 10^4$ | |
| | $MgCl_2 + NH_4OH$ | $AgNO_3$ | $4.1 \times 10^2$ | $2.3 \times 10^2$ | 0.35 |
| Fiberglass | None | None | $4.1 \times 10^2$ | $5.1 \times 10^4$ | |
| | $MgCl_2 + NH_4OH$ | $AgNO_3$ | $1.3 \times 10^1$ | $8.5 \times 10^1$ | 0.17 |
| Cellulose | None | None | 10 | $9.2 \times 10^4$ | |
| | $AgNO_3 + NaCl$ | None | 10 | $1.7 \times 10^2$ | 0.12 |

As can be seen in the tabulated results, bacterial counts in effluents from untreated filters or from filters modified only by the in situ precipitation of magnesium chloride increased to relatively high numbers after use. In contrast thereto, the bacterial counts in effluents from the filters modified with silver and mercury were less than 1% of the values from the control filters.

Table 19 demonstrates the inhibition of bacteria of commercially available bandages treated in accordance with the method of the invention.

In the tests, the indicated bacteria were spread on plate count agar. Sections of modified and unmodified bandages were placed on the plates. After 24 hours of incubation, the inhibition was measured as the distance between the edge of the bandage and the bacterial growth.

The modified samples were prepared by placing the bandage first in 4M manganese chloride followed by soaking in 3N ammonium hydroxide to precipitate manganese hydroxide thereon. Next, the bandage samples were placed in a solution of 0.1M silver nitrate, dried and stored until use.

The results set forth in Table 19 show clearly the enhancement of the antimicrobial characteristics of bandages treated in accordance with the method of the invention.

TABLE 19

| | | Inhibition zone (mm) | | |
| --- | --- | --- | --- | --- |
| Bandage type | Treatment | Pseudomonas aeroginosa | Staphylococcus aureus | Escherichia coli |
| Johnson & Johnson gauze | None | 0 | 0 | 0 |
| | Modified | 3 | 3 | 3 |
| Curity nonstick pads | None | 0 | 0 | 0 |
| | Modified | 4 | 5 | 5 |
| Johnson & Johnson nonstick pads | None | 0 | 0 | 0 |
| | Modified | 3 | 4 | 3 |

The following example demonstrates the modification of tubing to render it antimicrobial.

EXAMPLE 9

Polyvinyl chloride tubing (Tygon) was employed untreated or modified by each of two general methods. In the first method, the tubing was placed in a solution of 1M NaCl, heated for 20 min, and drained. A portion of the tubing was then mixed with a solution of 0.1N $AgNO_3$ for 20 min. The two portions (with and without treatment with $AgNO_3$) were rinsed in deionized water, dried and used. Tubing was also placed in a solution of 0.1N $AgNO_3$ for 20 min at room temperature, rinsed in deionized water and dried. In the second method, the tubing was heated in a solution of 2M $MgCl_2$ or 2M $MnCl_2$ for 20 min. The tubing was removed from the solution, dried, and mixed with 3N $NH_4OH$ for 20 min to precipitate the metals as the hydroxides. The tubing was then rinsed in deionized water and dried. The tubing was tested without additional modification or was soaked in 0.1N $AgNO_3$ for 20 min, rinsed in deionized water, and dried.

Sections of polyvinyl chloride (Tygon) tubing (approximately 5 cm) were placed in sterile petri plates. Next, 20 ml of melted plate-count agar with ca. $10^5$ CFU/ml of Escherichia coli were added to the plates. Following incubation at 37° C. for 24 hrs, the distance between the edge of the tubing and the bacterial growth was measured and reported as the inhibition zone. The results are set forth in Table 20.

Untreated tubing, tubing treated with sodium chloride or silver nitrate alone, and tubing modified by in situ precipitation of magnesium or manganese chloride did not inhibit bacterial growth. Clear bacteria-free zones were observed around the other sections of tubing.

TABLE 20

| Solutions used to modify tubing | Inhibition zone (mm) |
|---|---|
| None - untreated control | 0.0 |
| 1M NaCl | 0.0 |
| 1M NaCl + N AgNO$_3$ | 2.0 |
| 2M MgCl$_2$ + 3 N NH$_4$OH | 0.0 |
| 2M MgCl$_2$ + 3 N NH$_4$OH + 0.1 N AgNO$_3$ | 1.5 to 3.0 |
| 2M MnCl$_2$ + 3 N NH$_4$OH | 0.0 |
| 2M MnCl$_2$ + 3 N NH$_4$OH + 0.1 N AgNO$_3$ | 5.0 |

I claim:

1. A method of enhancing the antimicrobial properties of a surface comprising forming a stable association between said surface and an antimicrobial metal by the in situ precipitation or formation on said surface of a substantially water-insoluble polyvalent metal salt from an aqueous solution in contact with said surface, said polyvalent metal salt being capable of adsorbing cations of said antimicrobial metal and then contacting said surface with a solution containing cations of said antimicrobial metal whereby said cations are adsorbed onto said surface.

2. The product produced by the method of claim 1.

3. In a method of inhibiting the growth or proliferation of bacteria comprising contacting said bacteria with an antimicrobial metal, the improvement comprising contacting said bacteria with the product of claim 2.

4. The method of claim 1 wherein said stable association is formed by the in situ precipitation or formation of a substantially water insoluble salt of said antimicrobial metal from an aqueous solution in contact with said surface.

5. The method of claim 1 wherein said antimicrobial metal is silver, mercury or cadmium.

6. The method of claim 1 wherein said surface comprises activated carbon, diatomaceous earth, cellulose, modified cellulose, talc, fiberglass, sand, mixtures thereof, bandage material or catheter tubing.

7. A method of modifying the adsorptive characteristics of an adsorptive surface comprising forming a stable association between said surface and a substantially water-insoluble polyvalent metal salt by the in situ precipitation or formation of said polyvalent metal salt in contact with said adsorptive surface by the steps of substantially intimately wetting said adsorptive surface with an aqueous solution of a salt of said polyvalent metal and a first anion, substantially thoroughly drying said wetted adsorptive surface and then contacting said dried adsorptive surface with an aqueous solution containing a second anion which reacts with said polyvalent metal to form said water-insoluble polyvalent metal salt.

8. The adsorptive product of claim 7.

9. The method of claim 1 wherein said polyvalent metal is a metal selected from Groups IB, IIA, IIB, IIIA, IVB, VIB, and VIII of the Periodic Table or a mixture thereof.

10. The adsorptive product of claim 9.

11. The method of claim 9 wherein said polyvalent metal is iron, aluminum, lead, magnesium, silver, calcium, mixtures or alloys thereof.

12. The adsorptive product of claim 11.

13. The method of claim 7 wherein said polyvalent metal salt is a substantially water-insoluble oxide, hydroxide, phosphate, chromate or peroxide.

14. The adsorptive product of claim 13.

15. The method of claim 7 wherein said polyvalent metal salt is ferric hydroxide, ferrous hydroxide, magnesium hydroxide, magnesium oxide, magnesium perioxide, aluminum hydroxide, lead chromate or calcium hydroxide.

16. The adsorptive product of claim 15.

17. The method of claim 7 wherein said adsorptive surface is activated carbon, diatomaceous earth, cellulosic filter materials, talc, fiberglass filter materials, nitrocellulose, sand or mixtures thereof.

18. The adsorptive product of claim 17.

19. The method of claim 7 wherein said in situ formation is effected by reacting a substantially water-soluble salt of said polyvalent metal and a first anion with a substantially water-soluble compound comprising a cation and a second anion in an aqueous medium in contact with said adsorptive surface to form a precipitated salt of said polyvalent metal and said second anion in stable association with said adsorptive surface and a substantially water-soluble salt of said cation and said first anion.

20. The method of claim 19 wherein said adsorptive surface is first intimately wetted with an aqueous solution of said salt of polyvalent metal and first anion and subsequently wetted with an aqueous solution of said compound comprising said cation and said second anion whereby said precipitated polyvalent metal salt is formed in stable association with said adsorptive surface.

21. The method of claim 19 wherein said adsorptive surface is first intimately wetted with an aqueous solution of said salt of polyvalent metal and first anion and subsequently contacted with vapors of a reactant material which upon dissolution in said aqueous solution, forms said compound comprising said cation and said second anion.

22. The method of claim 20 also including the step of drying said subsequently wetted surface.

23. The method of claim 20 or 22 also including the step of removing excess aqueous solution following said first wetting step.

24. The method of claim 20 or 22 also including the step of drying said first wetted adsorptive surface prior to said subsequent wetting step.

25. The method of claim 7 wherein said substantially water-insoluble polyvalent metal salt is an oxide and is formed in situ by coating said adsorptive surface with a water-soluble salt of said polyvalent metal and heating said coated adsorptive surface to convert said salt to said polyvalent metal oxide.

26. The adsorptive product of claim 25.

27. The method of claim 25 wherein said adsorptive surface is coated by contacting it with an aqueous solution of said water-soluble polyvalent metal salt and drying said coated surface.

28. The method of claim 25 including the step of converting said polyvalent metal oxide to a polyvalent metal peroxide.

29. The method claim 28 wherein said polyvalent metal oxide is converted to said polyvalent metal peroxide by contact with an aqueous solution of a soluble peroxide.

30. The adsorptive product of claim 28.

31. The method of claim 17 wherein said soluble peroxide is hydrogen peroxide.

* * * * *